(12) United States Patent
Nguyen et al.

(10) Patent No.: US 11,490,456 B2
(45) Date of Patent: Nov. 1, 2022

(54) AUTOMATIC ANALYSIS AND WARNING METHOD OF OPTICAL CONNECTION BETWEEN BBU COMBINATION AND RRU OF RADIO STATION

(71) Applicant: VIETTEL GROUP, Ha Noi (VN)

(72) Inventors: Tien Sang Nguyen, Nam Dinh Province (VN); Ngoc Quy Le, Ha Noi (VN); Truong Giang Le, Ha Noi (VN); Xuan Thang Nguyen, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 137 days.

(21) Appl. No.: 17/138,409

(22) Filed: Dec. 30, 2020

(65) Prior Publication Data
US 2021/0274596 A1 Sep. 2, 2021

(30) Foreign Application Priority Data
Feb. 28, 2020 (VN) .............................. 1-2020-01145

(51) Int. Cl.
*H04B 10/07* (2013.01)
*H04W 88/08* (2009.01)
*H04B 10/2575* (2013.01)
*H04W 92/12* (2009.01)

(52) U.S. Cl.
CPC .... *H04W 88/085* (2013.01); *H04B 10/25753* (2013.01); *H04W 92/12* (2013.01)

(58) Field of Classification Search
CPC ........ H04B 3/46; H04B 10/07; H04B 10/071; H04B 10/073; H04B 10/0731; H04B 10/075; H04B 10/077; H04B 10/0771; H04B 10/0773; H04B 10/0775; H04B 10/0777; H04B 10/0779; H04B 10/07955; H04B 10/25753; H04W 24/08; H04W 88/085; H04W 92/12
See application file for complete search history.

(56) References Cited

U.S. PATENT DOCUMENTS

| | | | | |
|---|---|---|---|---|
| 10,470,070 | B1 * | 11/2019 | Ghaemi | ................ H04W 24/10 |
| 10,659,178 | B2 * | 5/2020 | Martel | ............... G01M 11/3109 |
| 2018/0062703 | A1 * | 3/2018 | Fang | ......................... H02J 1/00 |

FOREIGN PATENT DOCUMENTS

| | | | |
|---|---|---|---|
| WO | WO 2014/075725 | * | 5/2014 |
| WO | WO 2014/185657 | * | 11/2014 |
| WO | WO 2016/054183 | * | 4/2016 |

* cited by examiner

*Primary Examiner* — Frank Duong
(74) *Attorney, Agent, or Firm* — Patentttm.us

(57) ABSTRACT

An Automated Analysis and Warning of Optical Transmission (AWOT) between BBU unit and RRU of radio transmitting station accurately and quickly identifies errors on an optical transmission line, thereby reducing costs in terms of labor and equipment, and at the same time reducing service downtime of mobile communication systems.

1 Claim, 4 Drawing Sheets

```
root@BBC_PVT2:~# ./AWOT.sh
(1) BBU CPRI status: LOS = 1, LOF = 1.
(1) Check BBU SFP power:
open /dev/i2c-11

Temperatur   VCC    TX bias   TX power  RX power  Laser Temp   TEC
+ Error  : 110.00 °C  3.90 V  72.00 mA  1.259 mW  1.413 mW   0.00 °C   0.00 mA
+ Warning:  93.00 °C  3.70 V  68.00 mA  1.122 mW  1.122 mW   0.00 °C   0.00 mA
  Value  :  28.03 °C  3.30 V  59.40 mA  0.000 mW  0.004 mW   0.00 °C   0.00 mA
- Warning: -30.00 °C  2.90 V   3.00 mA  0.145 mW  0.013 mW   0.00 °C   0.00 mA
- Error  : -40.00 °C  2.70 V   1.00 mA  0.091 mW  0.008 mW   0.00 °C   0.00 mA (2) Connect to RRU unsuccessfully.

(5) OPT_SFP_BBU_BROKEN: Module SFP of BBU is broken.
```

Figure 5

```
root@BBC_PVT2:~# ./AWOT.sh
(1) BBU CPRI status: LOS = 1, LOF = 1.
(1) Check BBU SFP power:
open /dev/i2c-11

Temperatur   VCC    TX bias   TX power  RX power  Laser Temp   TEC
+ Error  : 110.00 °C  3.90 V  72.00 mA  1.259 mW  1.413 mW   0.00 °C   0.00 mA
+ Warning:  93.00 °C  3.70 V  68.00 mA  1.122 mW  1.122 mW   0.00 °C   0.00 mA
  Value  :  35.77 °C  3.29 V  47.94 mA  0.918 mW  0.606 mW   0.00 °C   0.00 mA
- Warning: -30.00 °C  2.90 V   3.00 mA  0.145 mW  0.013 mW   0.00 °C   0.00 mA
- Error  : -40.00 °C  2.70 V   1.00 mA  0.091 mW  0.008 mW   0.00 °C   0.00 mA (2) Connect to RRU successfully.

(3) Check RRU SFP power:
  Temperature: 54.917969 °C
  TX bias: 50.284000 mA
  VCC: 3.290700 V
  TX power: 0.727500 mW
  RX power: 0.017200 mW (4) Start to calculate attenuation of optical cable.
  BBU->RRU: D1 = 17.29 dB
  RRU->BBU: D2 = 8.26 dB (5) OPT_CABLE_BROKEN: Optical cable from BBU to RRU is broken.
```

Figure 6

```
root@BBC_PVT2:~# ./AWOT.sh
(1) BBU CPRI status: LOS = 0, LQF = 0.
(1) Check BBU SFP power:
open /dev/i2c-11

Temperatur  VCC     TX bias   TX power  RX power  Laser Temp  TEC
+ Error  :  110.00 °C  3.90 V  72.00 mA  1.259 mW  1.413 mW   0.00 °C   0.00 mA
+ Warning:   93.00 °C  3.70 V  60.00 mA  1.122 mW  1.122 mW   0.00 °C   0.00 mA
  Value  :   35.43 °C  3.29 V  46.00 mA  0.915 mW  0.005 mW   0.00 °C   0.00 mA
- Warning:  -30.00 °C  2.90 V   3.00 mA  0.145 mW  0.013 mW   0.00 °C   0.00 mA
- Error  :  -40.00 °C  2.70 V   1.00 mA  0.091 mW  0.008 mW   0.00 °C   0.00 mA (2) Connect to RRU unsuccesfully.

(5) OPT_CONN_ERROR_1: These situations maybe happen:
                     - Optical cable is broken
                     - Module SFP of RRU is broken
                     - RRU is OFF
```

Figure 7

AUTOMATIC ANALYSIS AND WARNING METHOD OF OPTICAL CONNECTION BETWEEN BBU COMBINATION AND RRU OF RADIO STATION

TECHNICAL AREAS MENTIONED

The present application refers to the method of automatically analyzing and warning the optical connection status between the base station device (Base Band Unit—BBU) and the high frequency radio receiver (Remote Radio Unit—RRU). The disclosure supports deployment engineers in station integration and optical transmission defect detection, thereby reducing effort, equipment costs, and also reducing network service outages.

THE TECHNICAL STATUS

In the mobile communication system, to meet the needs of large bandwidth and small signal delay, radio transmitting stations use standard radio interface (Common Public Radio Interface—CPRI) and optical transmission equipment for connection between BBU and RRU. These optical connections have many advantages including speed up to 24 Gbps, transmission distance of 10 km and bit error rate of $10^{-12}$. However, the quality of optical equipment such as the Small Form-factor Pluggable (SFP) and optical fiber cables are susceptible to deterioration with time, environmental impacts and incorrect installation skill. When the optical connection no longer works well, there will be errors such as signal loss, CPRI frame sync error, and more importantly, complete loss of connection to the RRU and interruption of mobile service. Therefore, maintaining an optical connection between the BBU and the RRU is very important to ensure smooth communication.

Usually, when the CPRI interface reports errors such as signal loss, frame alignment loss, most of these errors are due to optical transmission. However, because the RRU may be installed on a pole tens of meters high and far from the BBU, the operator could not find out exactly whether the cause of the error was SFP or optical wire in a short time. This leads to the fact that the operator will perform all fiber and SFP replacement on the BBU and RRU. This wastes time, effort and cost of equipment and materials, more importantly, it causes loss of network service in the process of finding fault and replacing installation.

THE PURPOSE OF THE DISCLOSURE

To solve the above problems, the authors of the disclosure researched and proposed the automatic method to Analyze and warn of optical connection status between BBU unit and RRU of a radio base station. When applying this method, it will save time to find the cause of the optical connection error, reduce the cost of manpower and equipment materials. At the same time, it reduces the time lost from network service connection for mobile devices

THE TECHNICAL NATURE OF THE DISCLOSURE

The disclosure proposes a method automatically analyzing and warning of the state of the optical transmission line in the radio transmitting station system based on the state of the CPRI interface and the optical power of the SFP, called the AWOT (Automated Analysis and Warning of Optical Transmission) method. The disclosed AWOT method identifies faults on the optical link between BBU and RRU, and provides warnings about optical transmission lines, thereby quickly fixing problems, reducing system downtime. mobile communication.

FIG. 1 illustrates a conventional radio base station, consisting of 2 main components: BBU and RRU. These two components are connected to each other via the CPRI interface standard, with the transmission device being the fiber optic cable and the SFP module. Fiber optic cable consists of 2 fibers, 1 fiber transmits signals from BBU to RRU, 1 fiber transmits signals from RRU to BBU. SFP modules consist of a transmit (TX) and a receive (RX) port. The RRU is installed on high poles and is several tens of meters to tens of kilometers away from BBU. Therefore, when optical connection failure occurs, it will take engineers who operate the system to find and correct the error.

Currently, SFP modules are integrated with a memory area to store parameters, including voltage, optical signal power emitted, optical signal power is obtained. These parameters have normal thresholds, alarm thresholds and error thresholds. The threshold values depend on the device code and are defined from production. A good quality photoelectric converter is one whose output voltage and output are within normal range. Particularly, the obtained optical power parameter depends on the quality of the optical wire and the emitted optical power of the equipment on the other side of the transmission line.

The AWOT method according to the invention includes the following steps:
(i) read the warning status of CPRI and optical power of the photoelectric converter module on the BBU.
(ii) connect to RRU via Ethernet interface, in case of successful connection, perform step (iii), otherwise, if connection is unsuccessful, perform step (v).
(iii) read the photoelectric converter module optical power on the RRU.
(iv) compute the attenuation on the optical link from BBU to RRU and vice versa, from RRU to BBU. Optical signal transmitted in optical fiber is always attenuated, the degree of attenuation depends on optical fiber type, fiber length and quality of optical fiber. The loss on the optical transmission line is calculated as the ratio between the transmitter optical power and the receiver optical power.
(v) analyze the fault on the optical link and give warnings based on three factors: the state of the CPRI unit, the emitted optical power of the SFP, and the optical loss on the link between the BBU and the RRU.

The method of the invention basically includes the above steps. By evaluating the measured photoelectric signal power level and the elimination methods, it is possible to conclude exactly where the error occurred. From there, it is recommended to restore the system quickly and accurately, to minimize waste and system downtime. In the following sections, the steps above will be described in more detail.

BRIEF DESCRIPTION OF FIGURES

FIG. 5 illustrates the results of implementing the AWOT method in case SFP on the BBU fails.

FIG. 6 illustrates the results of performing the AWOT method in the case of a damaged optical cord.

FIG. 7 illustrates the results of implementing the AWOT method in case of SFP on RRU failure.

DETAILED DESCRIPTION

Figure 1:
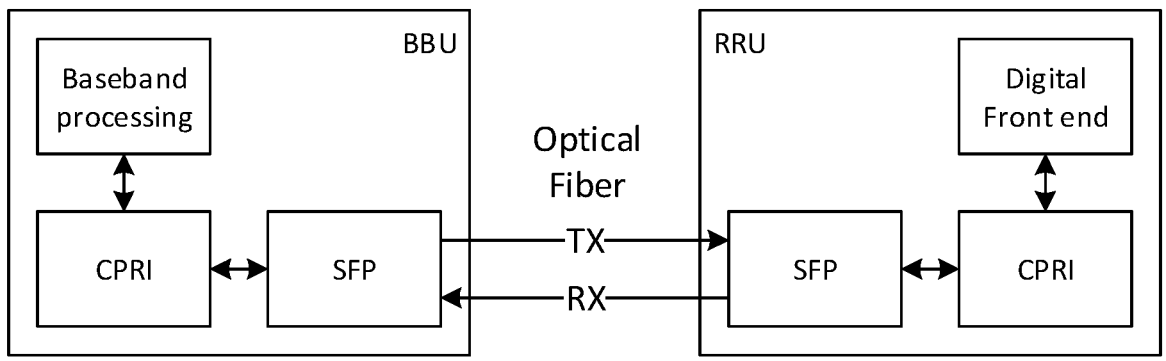
FIG. 1 depicts a radio reception station using CPRI and optical transmission.
Figure 2:
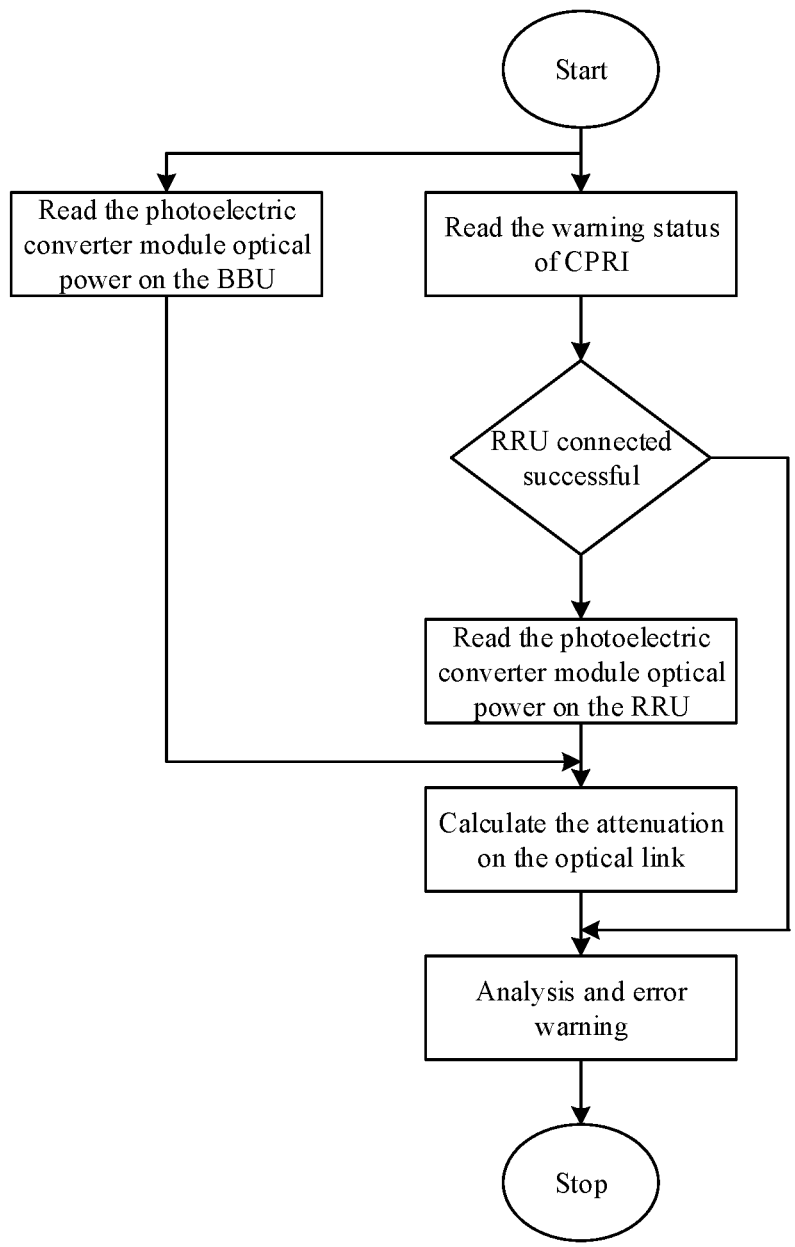
FIG. 2 shows a flowchart of the implementation steps of the AWOT method according to the invention.

The following section describes in detail the method of automatic analysis and warning of optical connection status between the BBU unit and the RRU unit in the radio base station. As shown in FIG. 2, the AWOT method under the invention includes the following 5 steps:

Step 1: Read Warning Status of CPRI and Optical Power of Photoelectric Converter Module on BBU The CPRI block has a register to store the alarm state, including the warnings about the transmission line such as loss of signal (LOS), loss of frame alignment (Loss Of Frame—LOF). The AWOT method reads the alarm register value of the CPRI to perform the analysis in Step 5. In parallel with the reading of the CPRI state, the AWOT method reads the TX and RX optical power values of the photoelectric converter module on BBU.

Step 2: Connect to the RRU Via Ethernet Interface, in Case of Successful Connection, Perform Step 3, Otherwise, if the Connection is not Successful, Perform Step 5.

The CPRI unit on the BBU and RRU has an Ethernet interface that is used for the exchange of management and control messages. Specifically, BBU can access the RRU via Ethernet interface to get information about the operational status of the RRU. The protocol used is Secure Shell (SSH), there are two situations, in case the connection is successful, follow step 3, if the connection is not successful, follow step 5.

Step 3: Read the Optical Power of SFP on the RRU

After BBU has access to the RRU, the AWOT method reads the TX and RX optical power of the photoelectric converter module on the RRU, and sends the reading to the BBU.

Step 4: Calculate the Attenuation on the Optical Link from BBU to RRU and Vice Versa, from RRU to BBU When there is enough data on the optical power of SFP on the RRU and BBU, AWOT method calculates the attenuation on the optical transmission line by the formula (1) below:

$$\Delta 1 = 10\log\left(\frac{P_{BBU\_TX}}{P_{RRU\_RX}}\right) \quad (1)$$

$$\Delta 2 = 10\log\left(\frac{P_{RRU\_TX}}{P_{BBU\_RX}}\right)$$

Inside, $\Delta 1$ (dB) is the attenuation on the optical path from BBU to RRU, $\Delta 2$ (dB) is the attenuation on the optical path from the RRU to the BBU, $P_{BBU\_TX}$ (mW) is the emitted optical power of SFP on the BBU, $P_{BBU\_RX}$ (mW) is the obtained optical power of SFP on the BBU, $P_{RRU\_TX}$ (mW) is the emitted optical power of SFP on the RRU, $P_{RRU\_RX}$ (mW) is the obtained optical power of SFP on the RRU, Step 5: Analyze the Fault on the Optical Transmission Line and Give Warnings First, the AWOT system performs analysis based on the state of the CPRI block. When there is no warning from the CPRI unit, and the optical power on the SFP is at a normal level, the AWOT system concludes that the optical connection is normal. Conversely, when there is an alarm from the CPRI unit, the AWOT system will automatically analyze the optical power value on the SFP of the BBU and RRU, thereby giving the alarms following Table 1:

TABLE 1

Circumstances associated with optical connection between BBU and RRU

| Situation | $P_{BBU\_TX}$ | $P_{BBU\_RX}$ | $P_{RRU\_TX}$ | $P_{RRU\_RX}$ | Connect the RRU | CPRI warnings | $\Delta 1$ | $\Delta 2$ | Error code |
|---|---|---|---|---|---|---|---|---|---|
| 1 | normal | normal | normal | normal | yes | no | $0 < \Delta 1 \leq$ attenuation threshold | $0 < \Delta 2 \leq$ attenuation threshold | OPT_CONN_NORMAL |
| 2 | normal | normal | normal | x | yes | yes | $\Delta 1 >$ Attenuation threshold | x | OPT_CABLE_BROKEN |
| 3 | normal | x | normal | normal | yes | yes | x | $\Delta 2 >$ Attenuation threshold | OPT_CABLE_BROKEN |
| 4 | normal | normal | normal | normal | yes | yes | $\Delta 1 < 0$ | $0 < \Delta 2 \leq$ attenuation threshold | OPT_SFP_BROKEN |
| 5 | normal | normal | normal | normal | yes | yes | $0 < \Delta 1 \leq$ attenuation threshold | $\Delta 2 < 0$ | OPT_SFP_BROKEN |
| 6 | error | x | x | x | x | x | x | x | OPT_SFP_BBU_BROKEN |
| 7 | normal | error | NA | NA | no | no | NA | NA | OPT_CONN_ERROR_1 |
| 8 | normal | normal | NA | NA | no | yes | NA | NA | OPT_CABLE_BROKEN |
| 9 | normal | normal | NA | NA | no | no | NA | NA | ETH_CONN_ERROR |

Inside,
Optical power $P_{BBU\_TX}$, $P_{BBU\_RX}$, $P_{RRU\_TX}$ and $P_{RRU\_RX}$ 3 thresholds are normal, warning and error,
x is the occurrence of any possible event,
NA is not applicable,
The attenuation threshold is the allowable attenuation on the optical transmission line, the attenuation threshold is calculated by the product of the attenuation coefficient α (dB/km) with the optical wire length L (km), α is defined according to the ITU Telecommunication standardization and summarized in Table 2 below:

TABLE 2

Loss coefficient by fiber type

| Fiber type | Wavelength (nm) | Attenuation coefficient α (dB/km) |
|---|---|---|
| G.652.A | 1310 | 0.5 |
| | 1550 | 0.4 |
| G.652.B | 1310 | 0.4 |
| | 1550 | 0.35 |
| | 1625 | 0.4 |
| G.652.C, G.652.D | 1310-1625 | 0.4 |
| G.653.A, G.653.B | 1550 | 0.35 |
| G.655.C, G.655.D, | 1550 | 0.35 |
| G.655.E | 1625 | 0.4 |

The error codes are defined in the following Table 3:

TABLE 3

Explanation of error codes

| Error code | Describe |
|---|---|
| OPT_CONN_NORMAL | Optical connection is in normal condition, without errors |
| OPT_CABLE_BROKEN | The optical cable is damaged |
| OPT_SFP_BROKEN | SFP on RRU or SFP on BBU fails |
| OPT_SFP_BBU_BROKEN | The SFP on the BBU is broken |
| OPT_CONN_ERROR_1 | It can happen in one of the following 3 cases: - Failure of optical cord from RRU to BBU - SFP on RRU failure - RRU off |
| ETH_CONN_ERROR | The Ethernet communication has an error |

Based on the automatic analysis and warning of optical connection condition described in Step 1 to Step 5 above, the AWOT method follows the patent. can accurately and quickly identify the cause of a fault on the optical transmission line automatically. This is also the main purpose of the method according to the patent.

Invention Execution Example

To demonstrate the effectiveness of the invention, an automated method of analyzing and warning the AWOT optical connection status was deployed and integrated into the BBU and RRU. The results of the test will help to evaluate the effectiveness of the method according to the invention.

Figures 3, 4:
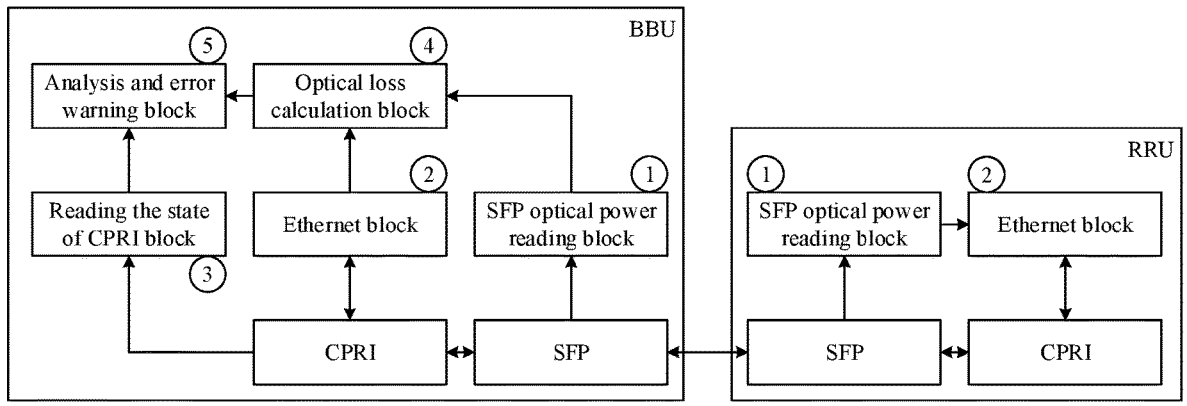
FIG. 3 shows a drawing of a radio base station using the AWOT method.
FIG. 4 illustrates the results of implementing the AWOT method in the case of good SFP and optical fiber.

As shown in FIG. 3, when integrated into BBU and RRU, the system adopts the AWOT method consisting of the following 5 processing blocks:
SFP optical power reading block;
Ethernet communication block;
Reading the state of CPRI block;
Optical loss calculation block;
Analysis and error warning block.

The functions of the blocks in this system are designed according to the calculation steps of the AWOT method according to the invention, specifically as follows:
1. SFP Optical Power Reading Block
This block performs optical power reading of photoelectric converter module through I2C communication standard (Inter-Integrated Circuit). This block is integrated on BBU and RRU. The value read is composed of the optical power emitted and the obtained optical power.
2. Ethernet Communication Block
When applying the AWOT method, the Ethernet communication unit is responsible for sending the optical power value of SFP on the RRU to BBU.
3. Reading the State of CPRI Block
This block performs CPRI access and reads the CPRI's state register. CPRI status includes normal operation (no warning) and alert state such as LOS alert, LOF alarm.
4. Optical Loss Calculation Block
This block computes the optical path attenuation from BBU to RRU and the optical path attenuation from RRU to BBU according to formula (1).
5. Analysis and Error Warning Block
After having information about the state of CPRI, optical power of SFP and optical loss on the transmission line, this block performs analysis and makes conclusions according to Table 1.

The configuration of the system applying the AWOT method is listed in Table 4.

TABLE 4

Table of experimental system parameters

| Parameters | Value |
|---|---|
| CPRI speed | 6,144 Gbps |
| Fiber length | 1000 m |
| Fiber type | G.652.A |
| SFP type | Finisar FTLF1326P3BTL, wave length 1310 nm |

Specifically, when deploying the system, we execute the following experiments:

Experiment 1: using SFP and good quality optical wire. As shown in FIG. 4, the program running on BBU retrieves information from the system applying the AWOT method and prints the information on the BBU operation window. The printed information is numbered 1 to 5 corresponding to the steps taken by the AWOT method. Note that the actual optical power value of SFP on the BBU is the line starting with the word "Value". It can be seen that FIG. 4 is the result of AWOT method implementation in case of good quality optical connection, AWOT system issue OPT_CONN_NORMAL message.

Experiment 2: using broken SFP for BBU. As shown in FIG. 5, the SFP's transmitting optical power is at the fault threshold, the AWOT method issues warning error code OPT_SFP_BBU_BROKEN.

Experiment 3: Using damaged optical wires. As shown in FIG. 6, the obtained optical power of SFP on the RRU is very small compared to the optical power emitted by the SFP on the BBU, i.e. the optical wire directed from the BBU to the RRU has a large attenuation, the AWOT method gives warning. error codeOPT_CABLE_BROKEN.

Experiment 4: using failed SFP for RRU. As shown in FIG. 7, the obtained optical power of SFP on BBU is at fault threshold, BBU cannot connect to RRU. The AWOT method then gives an error code warningOPT_CONN_ERROR_1.

Thus, when applying AWOT method, the status of optical connection between BBU and RRU is reported accurately and quickly.

EFFECTIVENESS OF THE INVENTION

The method of automatic analysis and warning of optical connection status between BBU unit and RRU of radio base station according to the patent is easy to apply and highly effective. The AWOT method according to the invention has solved the problem of finding the cause of the optical connection failure accurately and quickly. From there, it reduces the cost of labor and equipment, and at the same time, reduces the time lost telecommunications network service.

What is claimed is:

1. A method to automatically analyze and warn optical connection status between a BBU (Base Band Unit) and a RRU (Remote Radio Unit) in an Automated Analysis and Warning of Optical Transmission (AWOT) includes the following steps:
   (i) read a warning status of a CPRI (Common Public Radio Interface) and an optical power of a photoelectric converter module on the BBU;
   (ii) connect to the RRU via an Ethernet interface, in case of a successful connection, perform step (iii), otherwise, if connection is unsuccessful, perform step (v);
   (iii) read an optical power of the photoelectric converter module on the RRU;
   (iv) calculate an attenuation on an optical link from BBU to RRU and vice versa, from RRU to BBU using the following formula:

$$\Delta 1 = 10 \log\left(\frac{P_{BBU\_TX}}{P_{RRU\_RX}}\right) \quad (1)$$

$$\Delta 2 = 10 \log\left(\frac{P_{RRU\_TX}}{P_{BBU\_RX}}\right)$$

wherein,
$\Delta 1$ (dB) is the attenuation on the optical path from BBU to RRU,
$\Delta 2$ (dB) is the attenuation on the optical path from the RRU to the BBU,
$P_{BBU\_TX}$ (mW) is an emitted optical power of SFP on the BBU,
$P_{BBU\_RX}$ (mW) is an obtained optical power of SFP on the BBU,
$P_{RRU\_TX}$ (mW) is an emitted optical power of SFP on the RRU,
$P_{RRU\_RX}$ (mW) is an obtained optical power of SFP on the RRU;
   (v) analyze an optical transmission fault and give the following warnings:

| Situation | $P_{BBU\_TX}$ | $P_{BBU\_RX}$ | $P_{RRU\_TX}$ | $P_{RRU\_RX}$ | Connect the RRU | CPRI warnings |
|---|---|---|---|---|---|---|
| 1 | normal | normal | normal | normal | yes | no |
| 2 | normal | normal | normal | x | yes | yes |
| 3 | normal | x | normal | normal | yes | yes |
| 4 | normal | normal | normal | normal | yes | yes |
| 5 | normal | normal | normal | normal | yes | yes |
| 6 | error | x | x | x | x | x |
| 7 | normal | error | NA | NA | are not | no |
| 8 | normal | normal | NA | NA | are not | yes |
| 9 | normal | normal | NA | NA | are not | no |

| Situation | Δ1 | Δ2 | Error code |
|---|---|---|---|
| 1 | 0 < Δ1 ≤ attenuation threshold | 0 < Δ2 ≤ attenuation threshold | OPT_CONN_NORMAL |
| 2 | Δ1 > Attenuation threshold | x | OPT_CABLE_BROKEN |
| 3 | x | Δ2 > Attenuation threshold | OPT_CABLE_BROKEN |
| 4 | Δ1 < 0 | 0 < Δ2 ≤ attenuation threshold | OPT_SFP_BROKEN |
| 5 | 0 < Δ1 ≤ attenuation threshold | Δ2 < 0 | OPT_SFP_BROKEN |
| 6 | x | x | OPT_SFP_BBU_BROKEN |
| 7 | NA | NA | OPT_CONN_ERROR_1 |
| 8 | NA | NA | OPT_CABLE_BROKEN |
| 9 | NA | NA | ETH_CONN_ERROR | wherein,
Optical power $P_{BBU\_TX}$, $P_{BBU\_RX}$, $P_{RRU\_TX}$ and $P_{RRU\_RX}$ 3 thresholds are normal, warning and error,
x is an occurrence of any possible event,
NA is not applicable,
attenuation threshold is an allowable attenuation on the optical transmission line, attenuation threshold is calculated by a product of the attenuation coefficient $\alpha$ (dB/km) with an optical wire length L (km), $\alpha$ is defined in accordance to the ITU Telecommunication standardization and summarized in the following table:

| Fiber type | Wavelength (nm) | Attenuation coefficient α (dB/km) |
|---|---|---|
| G.652.A | 1310 | 0.5 |
|  | 1550 | 0.4 |
| G.652.B | 1310 | 0.4 |
|  | 1550 | 0.35 |
|  | 1625 | 0.4 |
| G.652.C, G.652.D | 1310-1625 | 0.4 |
| G.653.A, G.653.B | 1550 | 0.35 |
| G.655.C, G.655.D, G.655.E | 1550 | 0.35 |
|  | 1625 | 0.4 |

Error code is defined in the following table:

| Error code | Describe |
|---|---|
| OPT_CONN_NORMAL | Optical connection is in normal condition, without errors |
| OPT_CABLE_BROKEN | The optical cable is damaged |
| OPT_SFP_BROKEN | SFP on RRU or SFP on BBU fails |
| OPT_SFP_BBU_BROKEN | The SFP on the BBU is broken |
| OPT_CONN_ERROR_1 | It can happen in one of the following 3 cases: - Failure of optical cord from RRU to BBU - SFP on RRU failure - RRU off |
| ETH_CONN_ERROR | The Ethernet communication has an error. |

* * * * *